United States Patent
Yamnik

(10) Patent No.: US 12,463,581 B2
(45) Date of Patent: Nov. 4, 2025

(54) UNIVERSAL SOLAR PANEL SUPPORT SYSTEM

(71) Applicant: Feliks E. Yamnik, Raleigh, NC (US)

(72) Inventor: Feliks E. Yamnik, Raleigh, NC (US)

( * ) Notice: Subject to any disclaimer, the term of this patent is extended or adjusted under 35 U.S.C. 154(b) by 0 days.

(21) Appl. No.: 19/032,618

(22) Filed: Jan. 21, 2025

(65) Prior Publication Data

US 2025/0253801 A1 Aug. 7, 2025

Related U.S. Application Data

(60) Provisional application No. 63/550,234, filed on Feb. 6, 2024.

(51) Int. Cl.
- *H02S 20/30* (2014.01)
- *F16M 11/14* (2006.01)
- *F16M 11/18* (2006.01)

(52) U.S. Cl.
CPC ............ *H02S 20/30* (2014.12); *F16M 11/14* (2013.01); *F16M 11/18* (2013.01)

(58) Field of Classification Search
CPC .......... H02S 20/30; F16M 11/14; F16M 11/18
See application file for complete search history.

(56) References Cited

U.S. PATENT DOCUMENTS

| | | | |
|---|---|---|---|
| 9,093,582 B2 * | 7/2015 | Hamilton | H02S 30/20 |
| 9,531,320 B2 * | 12/2016 | Gonzalez Moreno | H02S 40/22 |
| 9,612,039 B2 * | 4/2017 | Meppelink | F24S 30/455 |
| 10,447,198 B2 * | 10/2019 | Mori | F24S 25/63 |
| 11,118,724 B1 | 9/2021 | Bayoumi | |
| 11,658,608 B2 * | 5/2023 | Allen | H02S 30/20 |
| | | | 136/245 |
| 11,689,146 B2 | 6/2023 | Al Tarabsheh et al. | |
| 11,757,400 B1 | 9/2023 | Jasmin et al. | |
| 11,799,414 B1 * | 10/2023 | Harvey | H02S 30/20 |
| 11,848,636 B2 | 12/2023 | Stephan et al. | |
| 11,848,638 B1 | 12/2023 | Jasmin | |
| 12,101,055 B2 * | 9/2024 | Eikelenboom | F24S 25/12 |
| 12,188,236 B2 * | 1/2025 | Flann | E04F 10/10 |
| 2009/0178703 A1 * | 7/2009 | Gumm | H02S 30/20 |
| | | | 136/244 |
| 2010/0000592 A1 * | 1/2010 | Ko | F24S 30/20 |
| | | | 136/246 |

(Continued)

FOREIGN PATENT DOCUMENTS

| | | |
|---|---|---|
| CN | 220173180 U | 12/2023 |
| DE | 9106505 U1 * | 9/1991 |

(Continued)

OTHER PUBLICATIONS

ISA/US, International Search Report and Written Opinion for International Patent Application No. PCT/US2025/012318, mailed Mar. 18, 2025, 9 pages.

*Primary Examiner* — Stanton L Krycinski
(74) *Attorney, Agent, or Firm* — NK Patent Law

(57) ABSTRACT

A universal solar panel support system including a plurality of universal solar panel corner supports for receiving solar panels. The universal solar panel support system is designed to transition from a resting, undeployed configuration to a lifted, deployed configuration to capture sunlight. The universal solar panel support system is mountable to a flat surface.

20 Claims, 15 Drawing Sheets

(56) References Cited

U.S. PATENT DOCUMENTS

| | | | |
|---|---|---|---|
| 2011/0005573 A1* | 1/2011 | Chang | H02S 20/00 |
| | | | 136/245 |
| 2014/0290157 A1* | 10/2014 | Wilson | F24S 20/63 |
| | | | 52/173.3 |
| 2019/0292805 A1* | 9/2019 | Gharabegian | H02S 20/30 |
| 2020/0091861 A1* | 3/2020 | Tally | H02S 10/40 |
| 2022/0060144 A1 | 2/2022 | Phelps | |
| 2022/0200524 A1* | 6/2022 | Krantz | H02S 10/40 |
| 2023/0010589 A1 | 1/2023 | Eikelenboom | |
| 2023/0184276 A1 | 6/2023 | Katz | |
| 2023/0253912 A1* | 8/2023 | Koziol | H02J 7/00 |
| | | | 136/244 |
| 2023/0283223 A1 | 9/2023 | Baird | |
| 2023/0387852 A1 | 11/2023 | Cui et al. | |
| 2023/0396208 A1 | 12/2023 | Pedlar et al. | |
| 2023/0399849 A1 | 12/2023 | Nill | |
| 2024/0171114 A1* | 5/2024 | Kroyzer | F24S 40/00 |

FOREIGN PATENT DOCUMENTS

| | | | | |
|---|---|---|---|---|
| DE | 102016219989 A1 * | 4/2018 | | |
| WO | WO-2016208164 A1 * | 12/2016 | | |
| WO | WO-2019044049 A1 * | 3/2019 | | H02S 20/10 |

* cited by examiner

UNIVERSAL SOLAR PANEL SUPPORT SYSTEM

CROSS-REFERENCE TO RELATED APPLICATIONS

This application is related to and claims priority to U.S. provisional patent application No. 63/550,234, filed on Feb. 6, 2024, the entire contents of which is incorporated by reference herein in its entirety.

BACKGROUND

Solar power is a desirable source of energy. In order to capture sunlight, solar panels are placed on top of buildings, recreational vehicles, rooftops, and other outdoor surfaces. Typically, solar panels are fixedly attached to these outdoor surfaces using support frames and rack systems.

FIELD OF THE INVENTION

The present invention is generally directed to solar panel support systems, more specifically to universal solar panel corner support systems.

DESCRIPTION OF RELATED ART

Current solar panel mounting systems can result in increased temperature and heat on the roof and similar mounting surfaces. Additionally, these solar panel mounting systems result in the solar panels constantly being exposed to environmental elements (e.g., rain). Yet another problem, vehicles with roof-mounted solar panels must park in a position that is advantageous for capturing sunlight. Additionally, vehicle roofs have limited surface area and space for supporting solar panels. Therefore, there is a need for a solar panel mounting system that addresses the aforementioned problems.

BRIEF SUMMARY

In some embodiments, the present invention includes a universal solar panel corner support comprising a lift mechanism, a rotating mechanism, and a plurality of solar panel mounting layers. The universal solar panel corner support is designed to move between a resting configuration, a lifted configuration, an undeployed configuration, and a deployed configuration. The lift mechanism is designed to raise and lower the plurality of solar panel mounting layers. The rotating mechanism moves (e.g., rotates) at least one solar panel mounting layer between an undeployed position and a deployed position.

In some embodiments, the present invention includes a universal solar panel support system comprising a plurality of universal solar corner supports designed to receive at least one solar panel. The universal solar panel support system is operable to transition between a resting configuration, a lifted configuration, an undeployed configuration, and a deployed configuration. The universal solar panel support system is mountable to a flat surface and is designed to control the positioning of the plurality of universal solar corner supports to track the position of the sun.

In some embodiments, a universal solar panel support is disclosed. The universal solar panel support includes a base, a lift mechanism, a rotating mechanism, and a plurality of solar panel mounting layers. Each solar panel mounting layer of the plurality of solar panel mounting layers is operable to receive a solar panel. The universal solar panel support is operable to move between a resting configuration and a standing configuration. The universal solar panel support is operable to move between an undeployed position and a deployed position.

In some embodiments, when in the resting configuration, the plurality of solar panel mounting layers is in a stacked configuration. In some embodiments, at least one solar panel mounting layer of the plurality of solar panel mounting layers is fixedly attached to the lift mechanism.

In some embodiments, the plurality of solar panel mounting layers includes a first solar panel mounting layer and a second solar panel mounting layer. The first solar panel mounting layer is attached to the lift mechanism. The second solar panel mounting layer is rotatably attached to the first solar panel mounting layer. In some embodiments, the second solar panel mounting layer is operable to rotate up to about 180 degrees. In some embodiments, the plurality of solar panel mounting layers includes a third solar panel mounting layer. The third solar panel mounting layer is positioned above the first solar panel mounting layer and the second solar panel mounting layer.

In some embodiments, the plurality of solar panel mounting layers is operable to receive at least one solar panel via an attachment mechanism including a fastener. In some embodiments, when moving from the resting configuration to the standing configuration, the lift mechanism is operable to extend away from the base. In some embodiments, when moving from the undeployed position to the deployed position, at least one solar panel mounting layer of the plurality of solar panel mounting layers is operable to extend away from the base. In some embodiments, the lift mechanism includes a ball joint connected to a base of the solar panel mounting layers. The rotating mechanism includes a worm gear mechanism.

In some embodiments, a universal solar panel support is disclosed. The universal solar panel support includes a base, at least one lift mechanism, at least one rotating mechanism, and a plurality of solar panel mounting layers. The at least one lift mechanism is attached to the base. The at least one lift mechanism is attached to at least one solar panel mounting layer of the plurality of solar panel mounting layers. The at least one rotating mechanism is connected to the plurality of solar panel mounting layers. The universal solar panel support is movable between a resting position and a standing position. When moving from the resting position to the standing position, the at least one lift mechanism is operable to extend away from the base.

In some embodiments, the universal solar panel support is further configured to move between an undeployed position and a deployed position. When moving from the undeployed position to the deployed position, the at least one rotating mechanism is operable to move at least one solar panel mounting layer of the plurality of solar panel mounting layers.

In some embodiments, when in the standing position, the plurality of solar panel mounting layers is in a stacked configuration. In some embodiments, the plurality of solar panel mounting layers includes a first solar panel mounting layer and a second solar panel mounting layer. The first solar panel mounting layer is attached to the at least one lift mechanism. The second solar panel mounting layer is rotatably attached to the first solar panel mounting layer. In some embodiments, the second solar panel mounting layer is operable to rotate up to about 180 degrees. In some embodiments, the plurality of solar panel mounting layers includes a third solar panel mounting layer. The third solar panel mounting layer is positioned above the first solar panel mounting layer and the second solar panel mounting layer.

In some embodiments, the plurality of solar panel mounting layers is operable to receive at least one solar panel via an attachment mechanism including a fastener. In some embodiments, the at least one lift mechanism includes a ball joint connected to a base of the solar panel mounting layers. The at least one rotating mechanism includes a worm gear mechanism. In some embodiments, each solar panel mounting layer of the plurality of solar panel mounting layers includes at least one hole operable to receive an end of the at least one lift mechanism. In some embodiments, the at least one rotating mechanism includes a first support member and a second support member. The first support member is rotatably connected to the second support member.

BRIEF DESCRIPTION OF THE SEVERAL VIEWS OF THE DRAWINGS

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
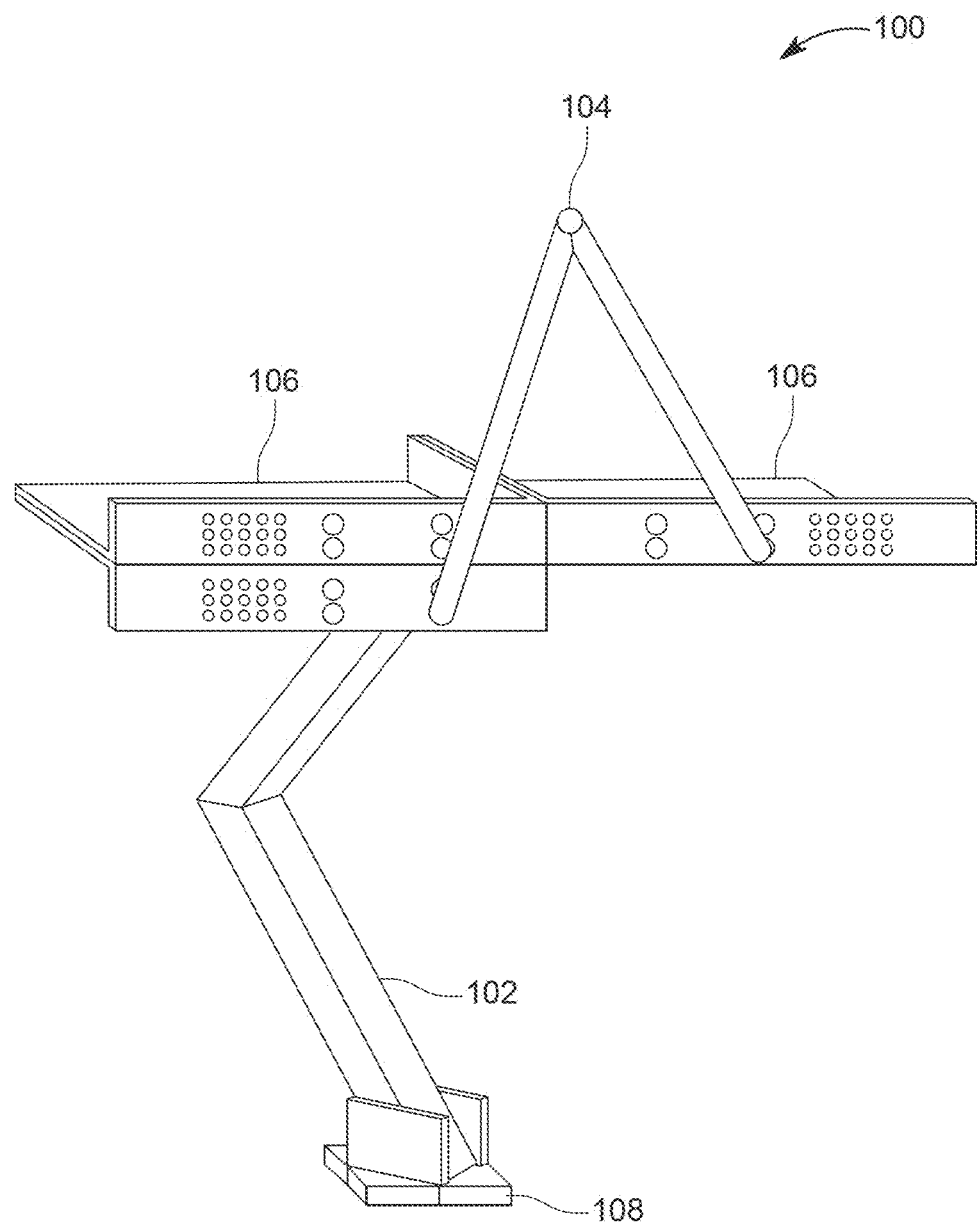
FIG. 1 illustrates a side perspective view of a universal solar panel support according to one embodiment of the present invention.

For the purposes of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

In some embodiments, the present invention includes a universal solar panel corner support comprising a lift mechanism, a rotating mechanism, and a plurality of solar panel mounting layers. The universal solar panel corner support is designed to move between a resting configuration, a lifted configuration, an undeployed configuration, and a deployed configuration. The lift mechanism is designed to raise and lower the plurality of solar panel mounting layers. The rotating mechanism moves (e.g., rotates) at least one solar panel mounting layer between an undeployed position and a deployed position.

In some embodiments, the present invention includes a universal solar panel support system comprising a plurality of universal solar corner supports designed to receive at least one solar panel. The universal solar panel support system is operable to transition between a resting configuration, a lifted configuration, an undeployed configuration, and a deployed configuration. The universal solar panel support system is mountable to a flat surface and is designed to control the positioning of the plurality of universal solar corner supports to track the position of the sun.

In some embodiments, a universal solar panel support is disclosed. The universal solar panel support includes a base, a lift mechanism, a rotating mechanism, and a plurality of solar panel mounting layers. Each solar panel mounting layer of the plurality of solar panel mounting layers is operable to receive a solar panel. The universal solar panel support is operable to move between a resting configuration and a standing configuration. The universal solar panel support is operable to move between an undeployed position and a deployed position.

In some embodiments, when in the resting configuration, the plurality of solar panel mounting layers is in a stacked configuration. In some embodiments, at least one solar panel mounting layer of the plurality of solar panel mounting layers is fixedly attached to the lift mechanism.

In some embodiments, the plurality of solar panel mounting layers includes a first solar panel mounting layer and a second solar panel mounting layer. The first solar panel mounting layer is attached to the lift mechanism. The second solar panel mounting layer is rotatably attached to the first solar panel mounting layer. In some embodiments, the second solar panel mounting layer is operable to rotate up to about 180 degrees. In some embodiments, the plurality of solar panel mounting layers includes a third solar panel mounting layer. The third solar panel mounting layer is positioned above the first solar panel mounting layer and the second solar panel mounting layer.

In some embodiments, the plurality of solar panel mounting layers is operable to receive at least one solar panel via an attachment mechanism including a fastener. In some embodiments, when moving from the resting configuration to the standing configuration, the lift mechanism is operable to extend away from the base. In some embodiments, when moving from the undeployed position to the deployed position, at least one solar panel mounting layer of the plurality of solar panel mounting layers is operable to extend away from the base. In some embodiments, the lift mechanism includes a ball joint connected to a base of the solar panel mounting layers. The rotating mechanism includes a worm gear mechanism.

In some embodiments, a universal solar panel support is disclosed. The universal solar panel support includes a base, at least one lift mechanism, at least one rotating mechanism, and a plurality of solar panel mounting layers. The at least one lift mechanism is attached to the base. The at least one lift mechanism is attached to at least one solar panel mounting layer of the plurality of solar panel mounting layers. The at least one rotating mechanism is connected to the plurality of solar panel mounting layers. The universal solar panel support is movable between a resting position and a standing position. When moving from the resting position to the standing position, the at least one lift mechanism is operable to extend away from the base.

In some embodiments, the universal solar panel support is further configured to move between an undeployed position and a deployed position. When moving from the undeployed position to the deployed position, the at least one rotating mechanism is operable to move at least one solar panel mounting layer of the plurality of solar panel mounting layers.

In some embodiments, when in the standing position, the plurality of solar panel mounting layers is in a stacked configuration. In some embodiments, the plurality of solar panel mounting layers includes a first solar panel mounting layer and a second solar panel mounting layer. The first solar panel mounting layer is attached to the at least one lift mechanism. The second solar panel mounting layer is rotatably attached to the first solar panel mounting layer. In some embodiments, the second solar panel mounting layer is operable to rotate up to about 180 degrees. In some embodiments, the plurality of solar panel mounting layers includes a third solar panel mounting layer. The third solar panel mounting layer is positioned above the first solar panel mounting layer and the second solar panel mounting layer.

In some embodiments, the plurality of solar panel mounting layers is operable to receive at least one solar panel via an attachment mechanism including a fastener. In some embodiments, the at least one lift mechanism includes a ball joint connected to a base of the solar panel mounting layers. The at least one rotating mechanism includes a worm gear mechanism. In some embodiments, each solar panel mounting layer of the plurality of solar panel mounting layers includes at least one hole operable to receive an end of the at least one lift mechanism. In some embodiments, the at least one rotating mechanism includes a first support member and a second support member. The first support member is rotatably connected to the second support member.

FIG. 1 illustrates a front perspective view of a universal solar panel corner support according to one embodiment of the present invention. The universal solar panel corner support 100 includes a lift mechanism 102, a rotating mechanism 104, a plurality of solar panel mounting layers 106, and a base 108. The universal solar panel corner support 100 is operable to move from a resting position to a standing position via the lift mechanism 102. The universal solar panel corner support is further operable to move from an undeployed position to a deployed position via the rotating mechanism 104. The universal solar panel corner support is mountable on a flat surface.

The lift mechanism 102 is operable to raise and lower the universal solar panel corner support to a desired height. The plurality of solar panel mounting layers include at least two layers. For example, and without limitation, each universal solar corner support is operable to receive a first solar panel via at least one solar panel mounting layer and a second solar panel via a second solar panel mounting layer. In the undeployed position, the solar panels are in a stacked configuration. The first solar panel mounting layer is fixedly attached to the lift mechanism. The second panel mounting layer is designed to rotate about 180 degrees. The second solar panel mounting layer includes a hinge that enables rotation in a horizontal direction. For example, and not limitation, the second solar panel mounting layer is operable to rotate to the left and/or right relative to the base of the universal solar panel corner support. The universal solar panel corner support is further operable to create a third solar panel mounting layer. The third solar panel mounting layer is positioned above the first solar panel mounting layer and the second solar panel mounting layer. Advantageously, the universal solar corner support is adjustable to position the hinge to enable moving between an undeployed position and a deployed position.

The rotating mechanism 104 is connected to the plurality of solar panel mounting layers 106. The rotating mechanism is connected to at least two support members. The rotating mechanism 104 rotates at least one layer of the plurality of solar panel mounting layers 106. In some embodiments, the rotating mechanism includes a worm gear mechanism designed to support rotational movement. The worm gear mechanism includes a motor, a worm, and a wheel. For example, and not limitation, the worm gear mechanism is operable to rotate the rotating mechanism at least ninety degrees as a result of a position change of the worm on the wheel.

In some embodiments, the rotating mechanism includes a first support member and a second support member. For example, and without limitation, the first support member is attached to a first solar panel mounting layer. The second support member is attached to a second solar panel mounting layer. The first support member is pivotably connected to the second support member. In some embodiments, the first support member and the second member are operable for rotation of one or more solar panel mounting layers.

Each solar panel mounting layer of the plurality of solar panel mounting layers is operable to receive at least one solar panel. For example, and without limitation, each solar panel mounting layer receives a solar panel via at least one attachment mechanism. The at least one attachment mechanism can include a screw, nut, bolt, and similar fasteners that are operable to attach a frame of a solar panel to the universal solar corner bracket. In some embodiments, the universal solar corner support may include an extension piece to improve stability by increasing the number of attachment points between the universal solar corner support and a solar panel. In some embodiments, the universal solar corner support is operable to receive a solar panel including a thickness of about 38 millimeters (1.5 inches) or less. In some embodiments, the universal solar corner support is operable to receive a solar panel including a thickness of at least 38 millimeters (1.5 inches). In some embodiments, the universal solar corner support is operable to receive a solar panel including a thickness of about 25 millimeter (1 inch) or less. The universal solar corner support is mountable on an automobile, a house, a recreational vehicle, a building, and other surfaces that can be exposed to sunlight.

Figure 2A:
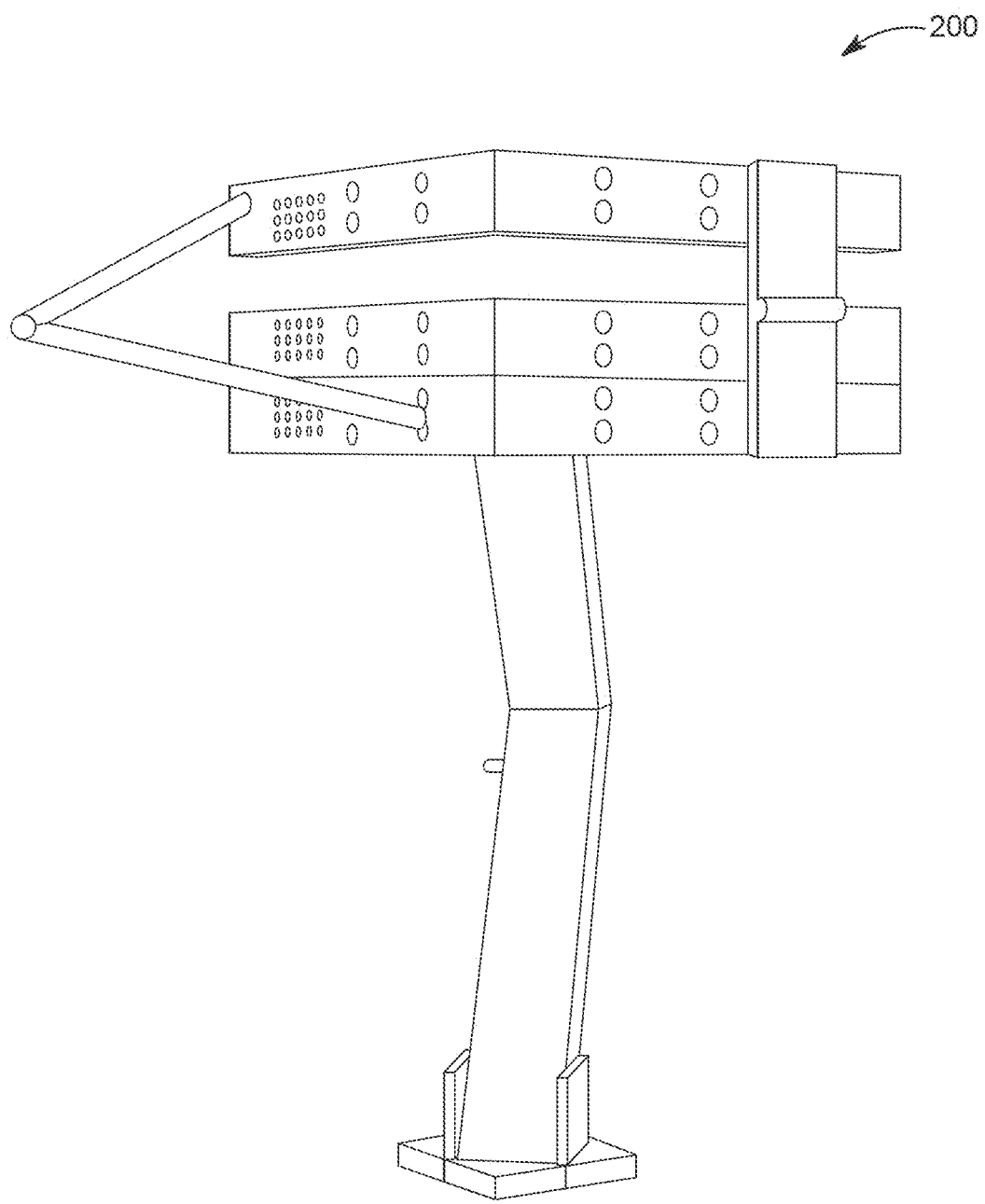
FIG. 2A illustrates a front perspective view of a universal solar panel support in a lifted position according to one embodiment of the present invention.
Figure 2B:
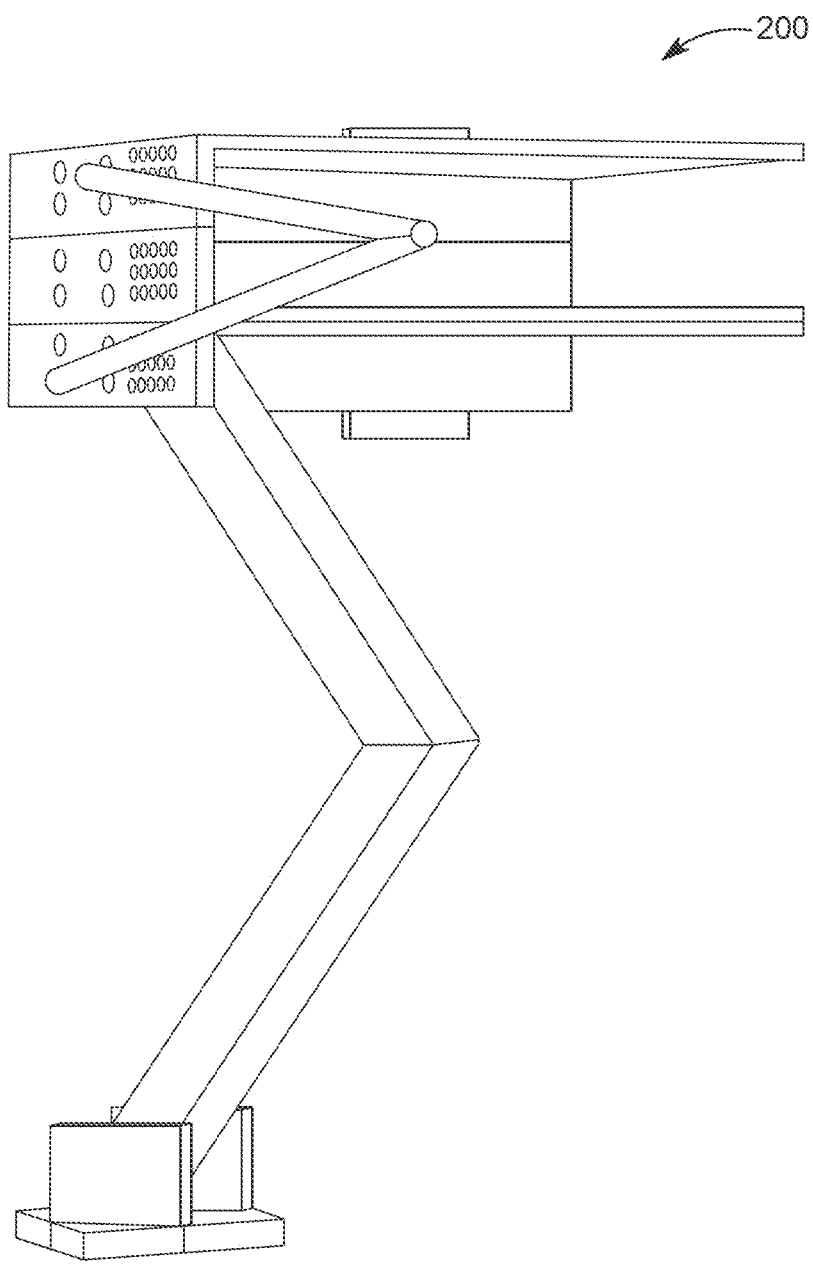
FIG. 2B illustrates a side perspective view of a universal solar panel support in a lifted position according to one embodiment of the present invention.
Figure 2C:
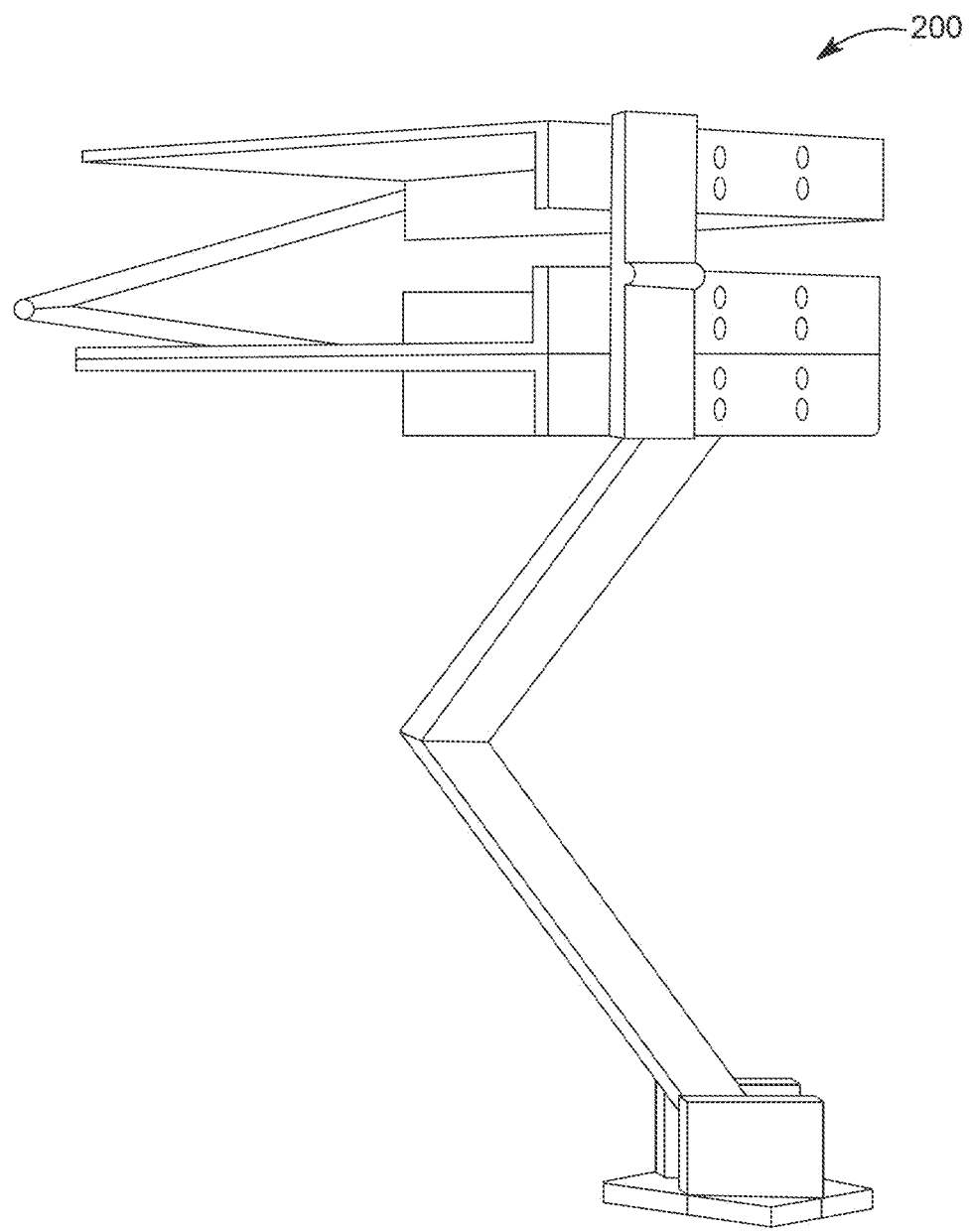
FIG. 2C illustrates a side perspective view of a universal solar panel support in a lifted position according to one embodiment of the present invention.
Figure 3A:
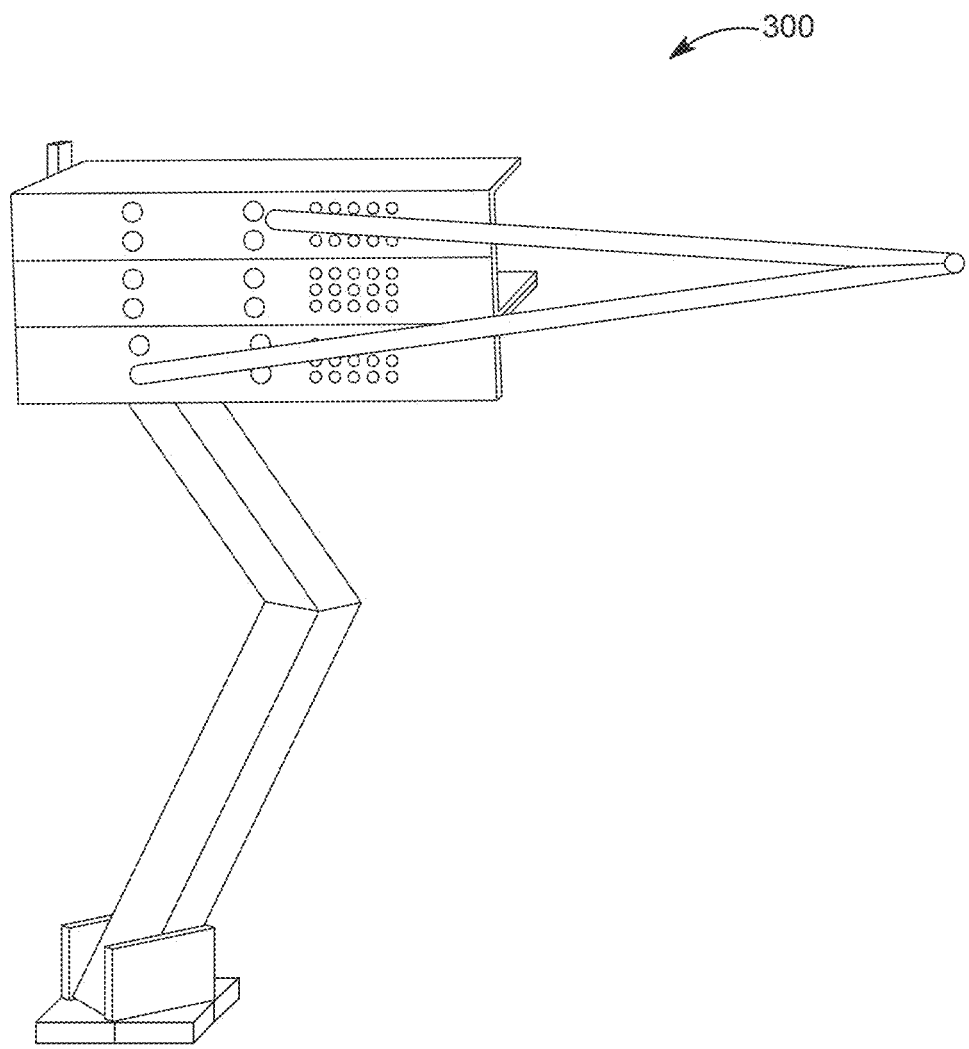
FIG. 3A illustrates a side perspective view of a universal solar panel support in a lifted position according to one embodiment of the present invention.
Figure 3B:
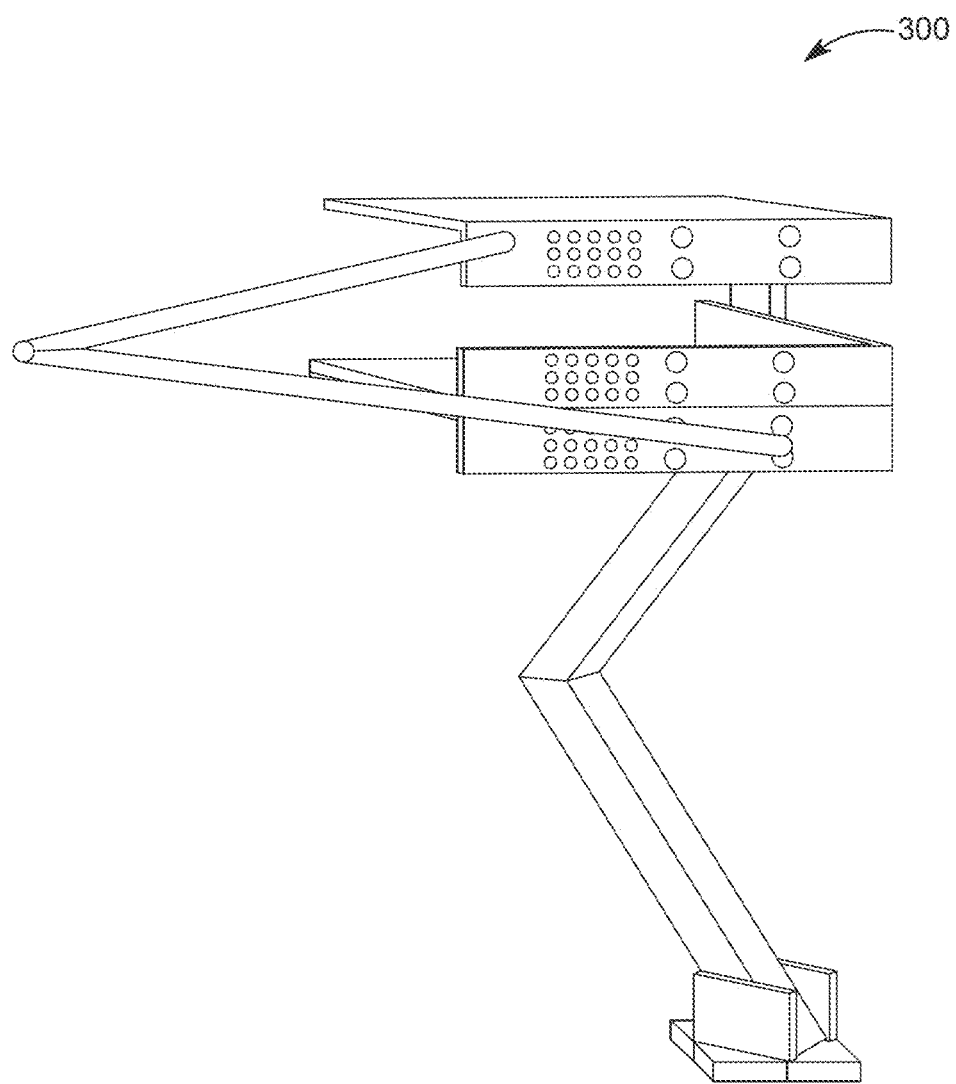
FIG. 3B illustrates a side perspective view of a universal solar panel support in a lifted position according to one embodiment of the present invention.
Figure 4A:
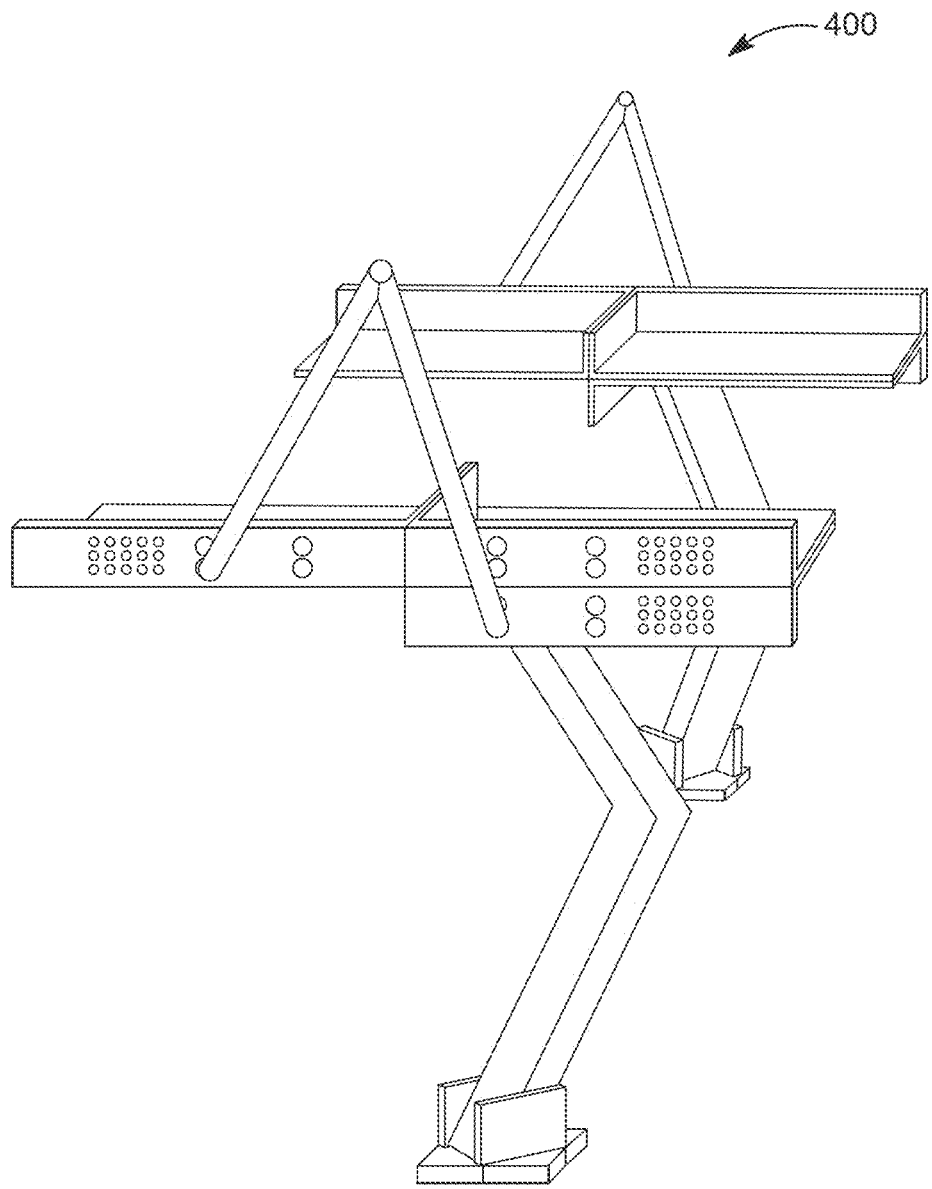
FIG. 4A illustrates a side perspective view of a universal solar panel support system in a lifted, deployed position according to one embodiment of the present invention.
Figure 4B:
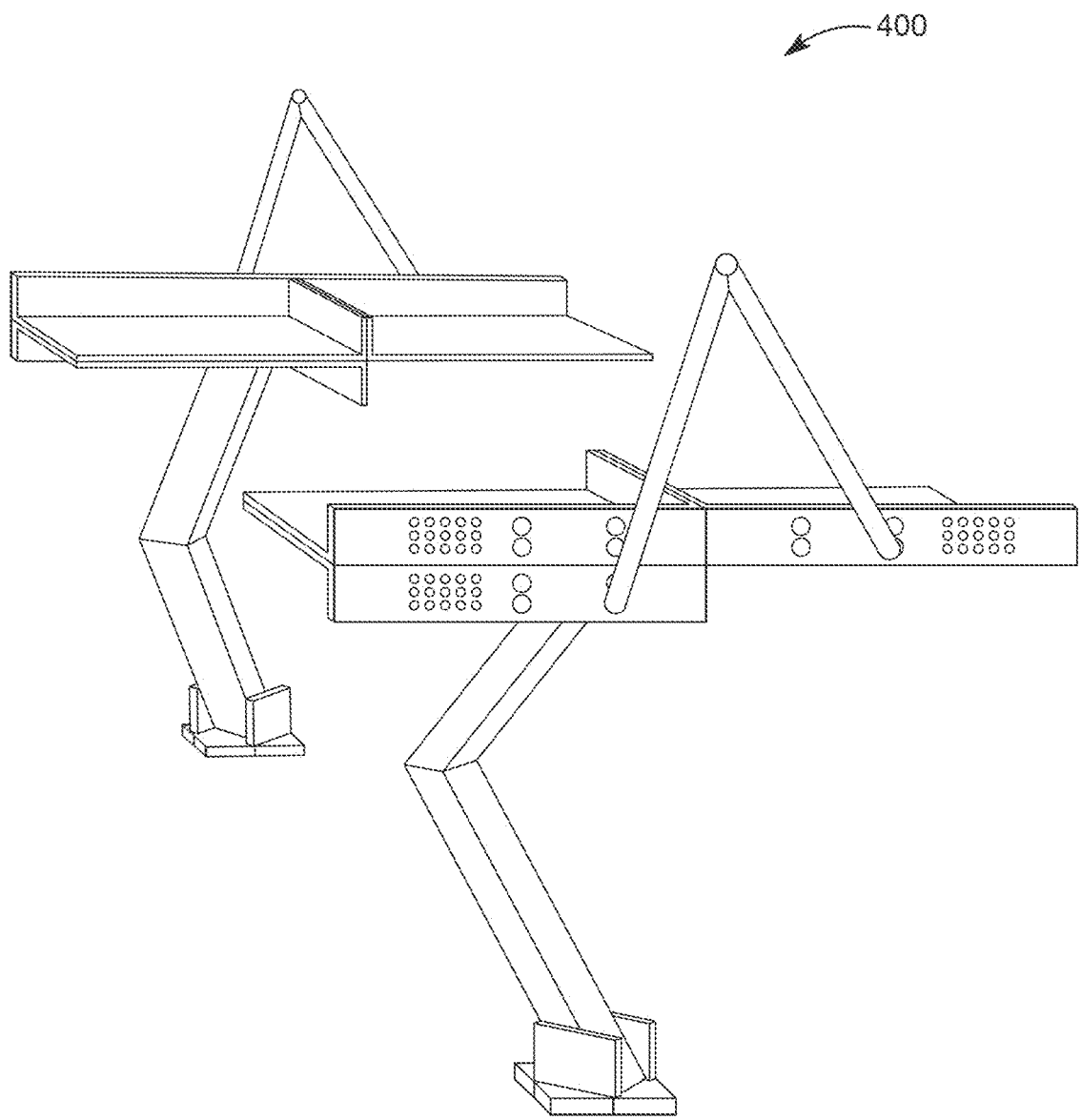
FIG. 4B illustrates a side perspective view of a universal solar panel support system in a lifted, deployed position according to one embodiment of the present invention.

FIGS. 2A-2C illustrate a perspective view of a universal solar panel corner support in a lifted position. FIG. 3A illustrates a perspective view of a universal solar panel corner support in a lifted position. The universal solar bracket corner support 300 includes a plurality of solar panel mounting layers in a stacked position. FIG. 3B illustrates a universal solar panel corner support 300 with a solar panel mounting layer in a raised position. FIGS. 4A-4B illustrate a universal solar panel corner support 400 in a lifted and deployed position. When moving from the resting configuration to the lifted and deployed configuration, the lift mechanism is raised and the rotating mechanism rotates a solar panel mounting layer around a hinge.

Figure 5:
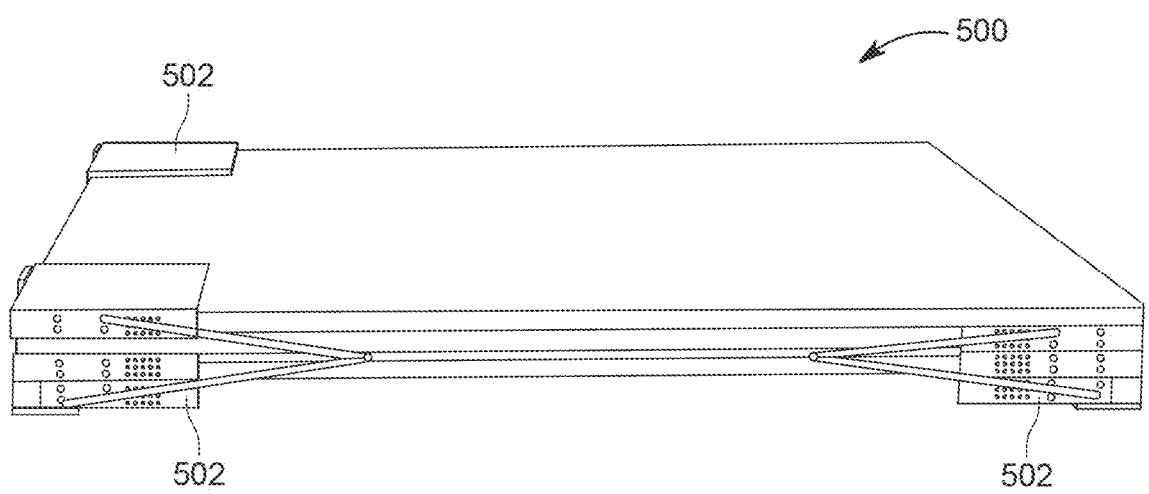
FIG. 5 illustrates a universal solar panel support system in a resting configuration according to one embodiment of the present invention.

FIG. 5 illustrates a universal solar panel support system according to one embodiment of the present invention. The universal solar panel support system 500 includes a plurality of universal solar panel corner supports 502. Each universal solar panel corner support 502 includes a lift mechanism, a plurality of solar panel mounting layers, and a rotating mechanism. For example, and without limitation, the universal solar panel corner support includes a universal panel corner support as illustrated in FIGS. 1-4B. The lift mechanism includes a ball joint connected to a base of a layer of solar panel mounting layers. The rotating mechanism includes a worm gear mechanism design to support rotational movement. The worm gear mechanism includes a motor, a worm, and a wheel. For example, and without limitation, the worm gear mechanism is operable to rotate the rotating mechanism at least ninety degrees as a result of a position change of a worm on the wheel.

Figure 6:
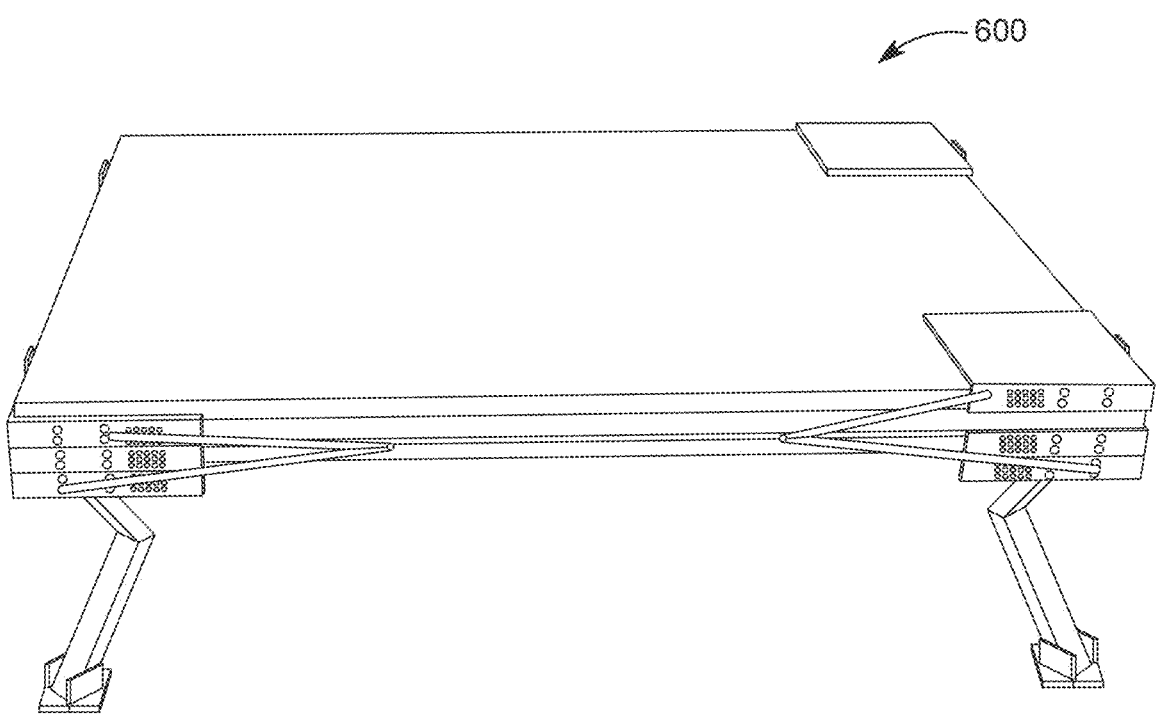
FIG. 6 illustrates a universal solar panel support system in a lifted configuration according to one embodiment of the present invention.
Figure 7:
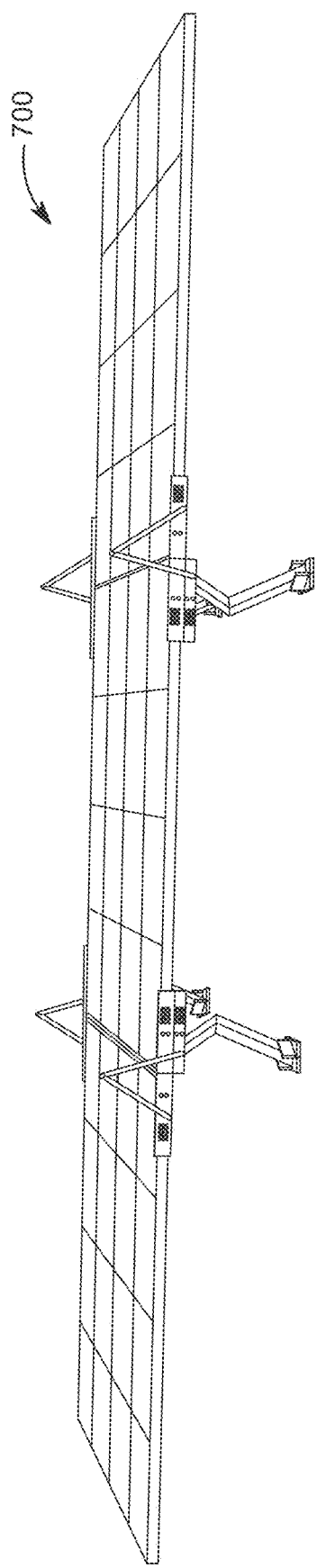
FIG. 7 illustrates a universal solar panel support system in a deployed configuration according to one embodiment of the present invention.

The universal solar panel support system is designed to move between a resting configuration, a lifted configuration, an undeployed configuration, and a deployed configuration. In the resting configuration, each universal solar panel corner support of the plurality of solar corner supports is in a lowered position and corresponding solar panel mounting layers are in a stationary position. As shown in the solar panel support system 600 of FIG. 6, when transitioning from the resting configuration to the lifted configuration, the lift mechanism extends upward and the universal solar panel corner support is lifted. When moving to the deployed configuration, the rotating mechanism is designed to rotate at least one solar panel mounting layer for at least one universal solar panel corner support. As a result, at least one solar panel moves from a stacked configuration (shown in FIG. 5) to an extended configuration (shown in solar panel support system 700 of FIG. 7).

The universal solar panel support system is operable to receive a plurality of solar panels via the plurality of universal solar corner supports. For example, and without limitation, the plurality of universal solar corner supports is operable to receive three solar panels. The plurality of solar panel corner supports is operable to lift the received solar panels at least about 457 millimeters (about 18 inches) above a mounting surface. The plurality of solar panel corner brackets is designed to move between about 457 millimeters (about 18 inches) and about 610 millimeters (about 24 inches) relative to the mounting surface. In some embodiments, the plurality of solar panel corner brackets is operable to move between about 305 millimeters (about 12 inches) and about 610 millimeters (about 24 inches) relative to a mounting surface.

Figure 8:
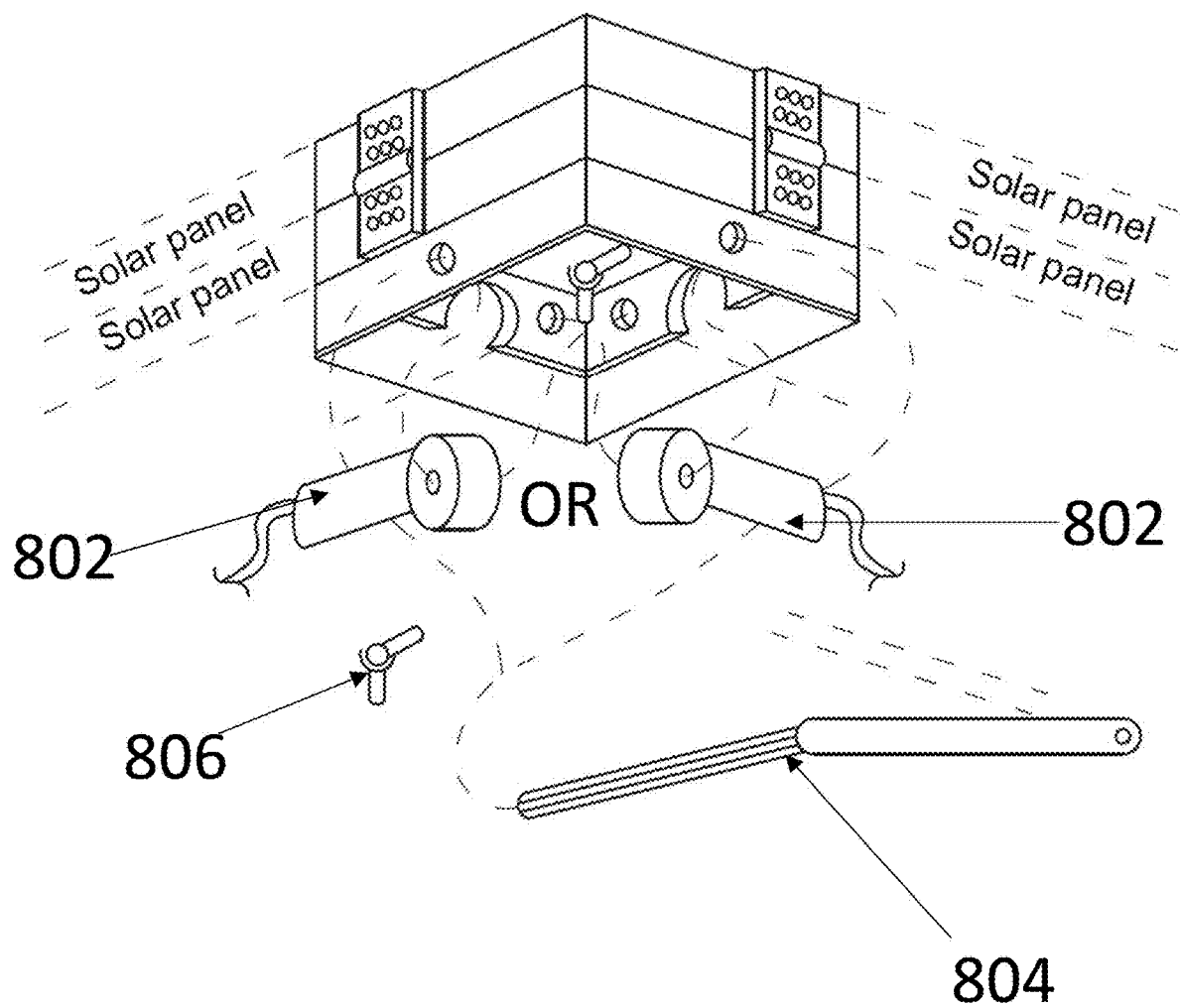
FIG. 8 illustrates an exploded view of a lift mechanism to a universal solar panel support system.
Figure 9:
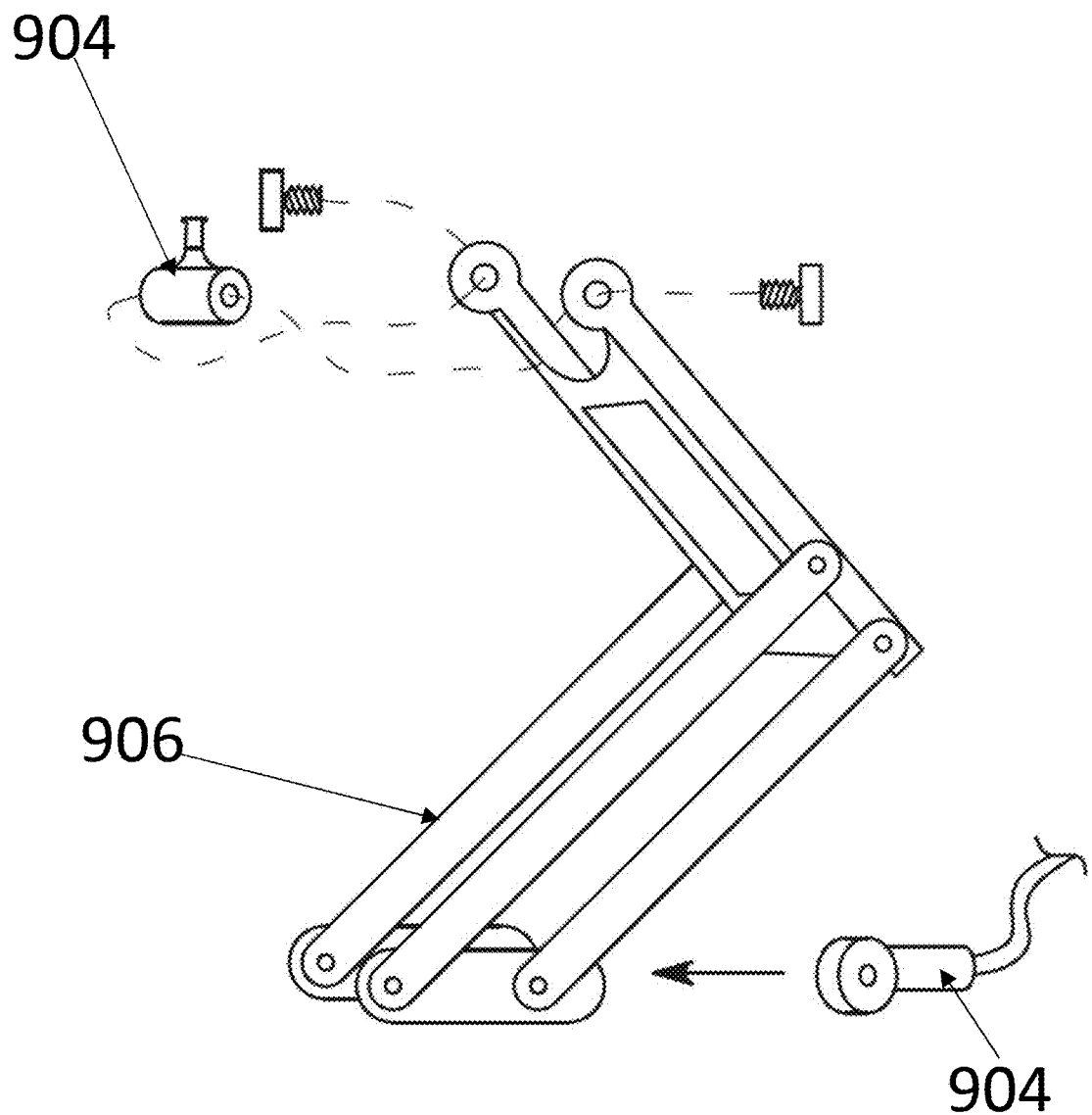
FIG. 9 illustrates a lift mechanism according to one embodiment of the present invention.

FIG. 8 illustrates an exploded view of a lift mechanism and a bracket of a universal solar panel support system. The lift mechanism includes a worm gear mechanism 802, a lift arm 804, and a ball joint 806. The lift arm 804 attaches to at least one side of the universal solar panel support system. The lift arm includes a ball joint connected to a base of a solar panel mounting layer. The rotating mechanism includes a worm gear mechanism designed to support rotational movement. The worm gear mechanism includes a motor, a worm, and a wheel. For example, and without limitation, the worm gear mechanism is operable to rotate a lift arm at least ninety degrees as a result of a position change of a worm on the wheel. FIG. 9 illustrates a lift mechanism according to one embodiment of the present invention. The lift mechanism 900 includes a worm gear motor 902, a ball joint 904, and a plurality of support members 906.

Figure 10:
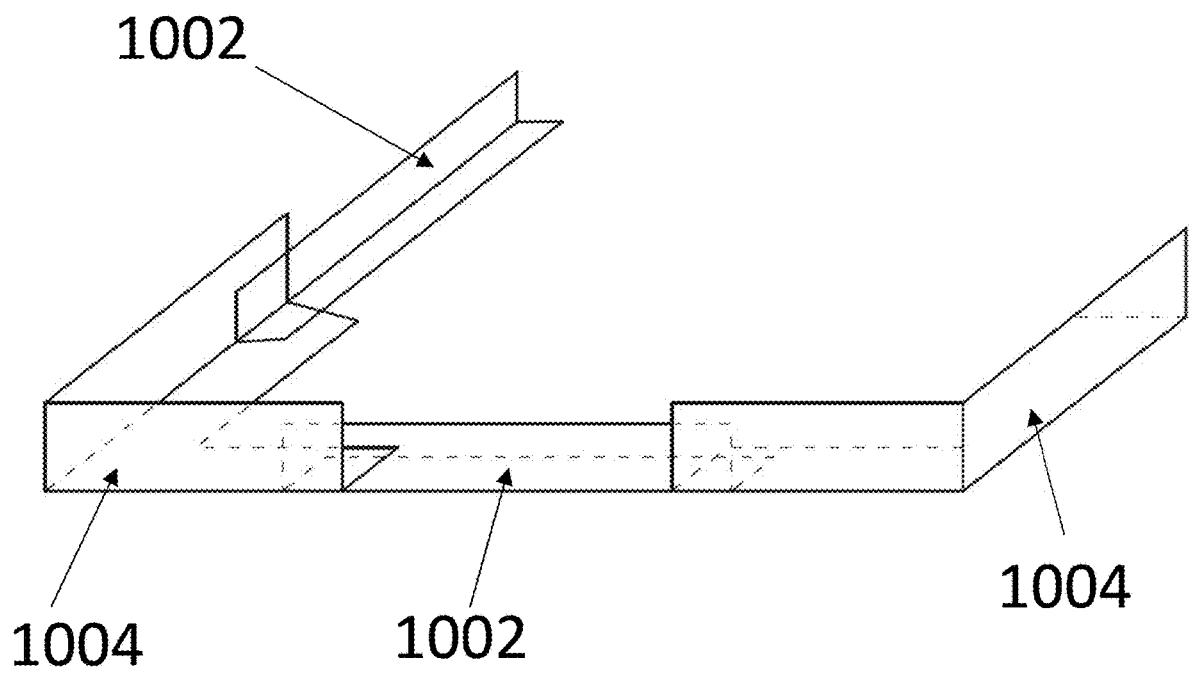
FIG. 10 illustrates a plurality of extension components of a universal solar panel support system according to one embodiment of the present invention.
Figures 11A, 11B:
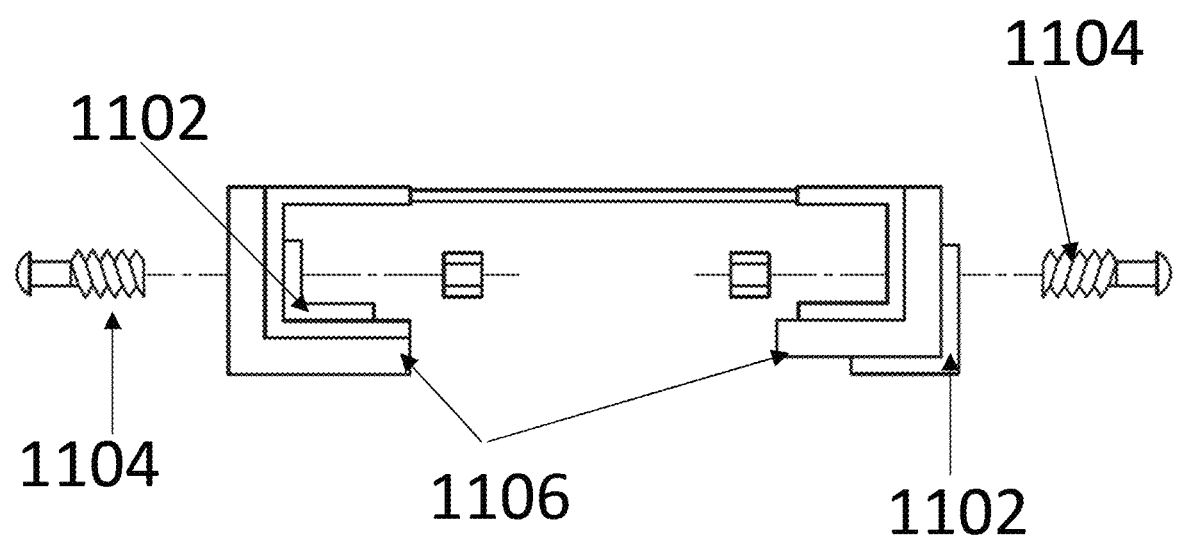
FIG. 11A illustrates a side view of an attachment of an extension component to an interior of a universal solar panel support bracket according to one embodiment of the present invention.
FIG. 11B illustrates a side view of an attachment of an extension component to an exterior of a universal solar panel support bracket according to one embodiment of the present invention.

FIG. 10 illustrates a plurality of extension pieces of a universal solar panel support system. The plurality of extension components 1002 provide additional support to solar panels attached to a bracket 1004. In some embodiments, the plurality of extension components is removably attached to a solar panel support bracket 1004. FIG. 11A illustrates a side view of an extension component and a bracket of a universal solar panel support system. The extension component 1102 attaches via a fastener 1104 to a solar bracket 1106. The extension component is operable to connect to a an interior of a solar bracket. In some embodiments, as shown in FIG. 11B, the extension component 1102 attaches to an exterior of the solar bracket 1106 via a fastener 1104.

In some embodiments, the universal solar panel support system includes at least one control system comprising at least one processor. The control system is in wired communication and/or wireless communication with each universal solar panel corner support. The at least one processor is operable to activate each lift mechanism and rotating mechanism of a universal solar panel corner support. The at least one processor is operable to independently control each universal corner bracket. For example, and without limitation, the at least one processor is operable to change the height of at least one lift mechanism based on the position of the sun. The at least one processor is further operable to change the height of each universal solar panel corner support as the position of the sun changes throughout the day. For example, and without limitation, the at least one processor is operable to receive sunlight data from an optical sensor via a wired connection and/or network connection. Alternatively, or additionally, the at least one processor is operable to automatically adjust the position of at least one universal solar panel corner support based on historical sunlight data, location data of the universal solar panel support system, and/or the amount of sunlight captured by the universal solar panel support system. In some embodiments, a plurality of universal solar panel support systems may be used and simultaneously controlled.

The processor manages the overall operations of universal solar panel support system. The processor is any controller, microcontroller, or microprocessor that is capable of processing program instructions. In one embodiment, the control electronics includes at least one antenna, which enables the universal solar panel support system to send information (e.g., panel position) to at least one remote device (e.g., smartphone, tablet, laptop computer) and/or receive information (e.g., movement commands, sunlight data) from at least one remote device. The at least one antenna provides wireless communication, standards-based or non-standards-based, by way of example and not limitation, radiofrequency (RF), BLUETOOTH, ZIGBEE, NEAR FIELD COMMUNICATION (NFC), or other similar communication methods.

In some embodiments, the universal solar panel support system includes a cover. The cover includes a plurality of corner components, a top, and a plurality of horizontal components. The cover may be a unitary piece or separately connected components. The cover is designed to cover the solar panels and top of the solar corner brackets when the system is lowered and not deployed. Advantageously, the universal solar panel support system cover is designed to reduce aerodynamic forces when in a lowered position.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A universal solar panel corner support comprising:
   a base;
   a lift mechanism;
   a rotating mechanism; and
   a plurality of solar panel mounting layers;
      wherein each solar panel mounting layer comprises a substantially perpendicular corner for receiving a corner of a solar panel;
      wherein the universal solar panel corner support is operable to move between a resting configuration and a standing configuration, wherein, in the resting configuration, the plurality of solar panel mounting layers is in a stacked configuration; and
      wherein the universal solar panel corner support is operable to move between an undeployed position and a deployed position.

2. The universal solar panel corner support of claim 1, wherein at least one solar panel mounting layer of the plurality of solar panel mounting layers is fixedly attached to the lift mechanism.

3. The universal solar panel corner support of claim 1, wherein the plurality of solar panel mounting layers includes a first solar panel mounting layer and a second solar panel mounting layer, wherein the first solar panel mounting layer is attached to the lift mechanism, wherein the second solar panel mounting layer is rotatably attached to the first solar panel mounting layer.

4. The universal solar panel corner support of claim 3, wherein the rotating mechanism is configured to separate the second solar panel mounting layer from the first solar panel mounting layer, wherein the second solar panel mounting layer is configured to receive a corner of a second solar panel.

5. The universal solar panel corner support of claim 3, wherein the plurality of solar panel mounting layers includes a third solar panel mounting layer, wherein, when in the stacked configuration, the third solar panel mounting layer is positioned above the first solar panel mounting layer and the second solar panel mounting layer.

6. The universal solar panel corner support of claim 1, wherein the plurality of solar panel mounting layers is operable to receive the solar panel via an attachment mechanism, wherein the attachment mechanism includes a fastener, wherein each solar panel mounting layer includes at least one hole for receiving the attachment mechanism.

7. The universal solar panel corner support of claim 1, wherein, when moving from the resting configuration to the standing configuration, the lift mechanism is operable to extend away from the base.

8. The universal solar panel corner support of claim 1, wherein the lift mechanism includes a ball joint connected to a base of the solar panel mounting layers, wherein the rotating mechanism includes a worm gear mechanism.

9. A universal solar panel support comprising:
a base;
at least one lift mechanism;
at least one rotating mechanism; and
a plurality of solar panel mounting layers;
wherein the at least one lift mechanism is attached to the base;
wherein the at least one lift mechanism is attached to a bottom surface of at least one solar panel mounting layer of the plurality of solar panel mounting layers;
wherein the at least one rotating mechanism is connected to the plurality of solar panel mounting layers;
wherein the plurality of solar panel mounting layers is configured to receive at least one solar panel, wherein the at least one solar panel is removably attached to the plurality of solar panel mounting layers; and
wherein the universal solar panel support is movable between a resting position and a standing position, wherein, when moving from the resting position to the standing position, the at least one lift mechanism is operable to extend away from the base; and
wherein the universal solar panel support is further configured to move between an undeployed position and a deployed position, wherein, when moving from the undeployed position and the deployed position, the at least one rotating mechanism is operable to separate at least one solar panel mounting layer of the plurality of solar panel mounting layers.

10. The universal solar panel support of claim 9, wherein, when in the resting position, the plurality of solar panel mounting layers is in a stacked configuration, wherein, when in the deployed position, the plurality of solar panel mounting layers is in an unstacked configuration.

11. The universal solar panel support of claim 9, wherein the plurality of solar panel mounting layers includes a first solar panel mounting layer and a second solar panel mounting layer, wherein the first solar panel mounting layer is attached to the at least one lift mechanism, wherein, via the at least one rotating mechanism, the second solar panel mounting layer is rotatably attached to the first solar panel mounting layer, wherein the at least one rotating mechanism is configured to separate the second solar panel mounting layer away from the first solar panel mounting layer, wherein the second solar panel mounting layer is configured to receive a second solar panel.

12. The universal solar panel support of claim 11, wherein the second solar panel mounting layer is operable to rotate up to about 180 degrees relative to the first solar panel mounting layer.

13. The universal solar panel support of claim 11, wherein the plurality of solar panel mounting layers includes a third solar panel mounting layer, wherein the third solar panel mounting layer is positioned above the first solar panel mounting layer and the second solar panel mounting layer.

14. The universal solar panel support of claim 9, wherein the plurality of solar panel mounting layers is operable to receive at least one solar panel via an attachment mechanism, wherein the attachment mechanism includes a fastener, wherein each solar panel mounting layer includes at least one hole for receiving the attachment mechanism.

15. The universal solar panel support of claim 9, wherein the at least one lift mechanism includes a ball joint connected to a base of the solar panel mounting layers, wherein the at least one rotating mechanism includes a worm gear mechanism.

16. The universal solar panel support of claim 9, wherein each solar panel mounting layer of the plurality of solar panel mounting layers includes at least one hole operable to receive an end of the at least one lift mechanism.

17. The universal solar panel support of claim 9, wherein, when moving from the undeployed position to the deployed position, the at least one rotating mechanism is operable to separate a first solar panel mounting layer of the plurality of solar panel mounting layers from a second solar panel mounting layer of the plurality of solar panel mounting layers, wherein the at least one rotating mechanism includes a first support member and a second support member, wherein the first support member is rotatably connected to the second support member, wherein a first end of the first support member is connected to the first solar panel mounting layer, wherein a first end of the second support member is connected to the second solar panel mounting layer, wherein a second end of the first support member is rotatably connected to the second end of the second support member, wherein, when moving between the undeployed position and the deployed position, the first end of the second support member moves away from the first end of the first support member.

18. The universal solar panel support of claim 9, wherein each solar panel mounting layer of the plurality of solar panel mounting layers includes at least two walls and a floor, wherein the at least two walls and a floor form a corner, wherein each solar panel mounting layer of the plurality of solar panel mounting layers is operable to receive a corner of a solar panel via the formed corner.

19. The universal solar panel corner support of claim 1, wherein the substantially perpendicular corner includes at least two walls and a floor, wherein each solar panel mounting layer of the plurality of solar panel mounting layers is operable to receive the corner of the solar panel via the substantially perpendicular corner.

20. The universal solar panel corner support of claim 1, wherein, when moving from the undeployed position to the deployed position, the at least one rotating mechanism is operable to separate a first solar panel mounting layer of the plurality of solar panel mounting layers from a second solar panel mounting layer of the plurality of solar panel mounting layers, wherein the at least one rotating mechanism includes a first support member and a second support member, wherein a first end of the first support member is connected to the first solar panel mounting layer, wherein a first end of the second support member is connected to the second solar panel mounting layer, wherein a second end of the first support member is rotatably connected to a second end the second support member, wherein, when moving between the undeployed position and the deployed position, the first end of the second support member moves away from the first end of the first support member.

* * * * *